United States Patent
Funk

(10) Patent No.: US 8,084,556 B2
(45) Date of Patent: Dec. 27, 2011

(54) METHOD FOR PREPARING WATER-ABSORBING POLYMER PARTICLES BY SUSPENSION POLYMERIZATION

(75) Inventor: Rüdiger Funk, Niedernhausen (DE)

(73) Assignee: BASF SE, Ludwigshafen (DE)

( * ) Notice: Subject to any disclaimer, the term of this patent is extended or adjusted under 35 U.S.C. 154(b) by 259 days.

(21) Appl. No.: 12/516,281

(22) PCT Filed: Dec. 3, 2007

(86) PCT No.: PCT/EP2007/063122
§ 371 (c)(1),
(2), (4) Date: May 26, 2009

(87) PCT Pub. No.: WO2008/068208
PCT Pub. Date: Jun. 12, 2008

(65) Prior Publication Data
US 2010/0069235 A1     Mar. 18, 2010

(30) Foreign Application Priority Data
Dec. 6, 2006   (EP) .................................. 06125540

(51) Int. Cl.
C08F 2/00    (2006.01)
C08F 20/06   (2006.01)
B01J 20/26   (2006.01)

(52) U.S. Cl. .......... 526/72; 502/402; 526/317.1
(58) Field of Classification Search ............ 502/402; 526/910, 72, 317.17
See application file for complete search history.

(56) References Cited

U.S. PATENT DOCUMENTS

| 5,618,497 A | 4/1997 | Ueda et al. |
| 6,114,478 A | 9/2000 | Kersting et al. |
| 2005/0074614 A1* | 4/2005 | Jonas et al. ............... 428/411.1 |

FOREIGN PATENT DOCUMENTS

| EP | 0 849 285 A2 | 6/1998 |
| JP | 63 218702 A | 9/1988 |
| WO | WO-2006/014031 A1 | 2/2006 |

OTHER PUBLICATIONS

International Search Report and Written Opinion in PCT/EP2007/063122 dated Mar. 18, 2008.
Buchholz et al., *Modern Superabsorbent Polymer Technology*, pp. 69-117 (1998).

* cited by examiner

*Primary Examiner* — William Cheung
(74) *Attorney, Agent, or Firm* — Marshall, Gerstein & Borun LLP

(57) ABSTRACT

In a process for producing water-absorbing polymeric particles by suspension polymerization, a monomer solution is metered into a stirred reactor via at least one feed line, the stirred reactor has a volume of at least 1 m$^3$ and the at least one feed line ends in the stirred reactor at a point less than 25 cm above the liquid surface.

12 Claims, No Drawings

METHOD FOR PREPARING WATER-ABSORBING POLYMER PARTICLES BY SUSPENSION POLYMERIZATION

CROSS-REFERENCE TO RELATED APPLICATIONS

This is the U.S. national phase of International Application No. PCT/EP2007/063122, filed Dec. 3, 2007, which claims the benefit of EP 06125540.2, filed Dec. 6, 2006.

The present invention relates to a process for producing water-absorbing polymeric particles by a suspension polymerization in which a monomer solution is metered into a stirred reactor via at least one feed line, the stirred reactor has a volume of at least 1 $m^3$ and the feed line ends in the stirred reactor at a point less than 25 cm above the liquid surface.

The production of water-absorbing polymeric particles is described in the monograph "Modern Superabsorbent Polymer Technology", F. L. Buchholz and A. T. Graham, Wiley-VCH, 1998 pages 69 to 117. The water-absorbing polymeric particles are typically produced by solution polymerization or suspension polymerization.

Water-absorbing polymers are used as aqueous solutions of absorbing products to produce diapers, tampons, sanitary napkins and other hygiene articles, but also as water-retaining agents in market gardening.

The properties of water-absorbing polymers can be controlled via the degree of crosslinking. Gel strength increases and absorptive capacity decreases with increasing degree of crosslinking.

To improve their performance characteristics, for example Saline Flow Conductivity (SFC) in the diaper and Absorbency Under Load (AUL), water-absorbing polymeric particles are generally postcrosslinked. This increases the degree of crosslinking of the particle surface only, making it possible to decouple Absorbency Under Load (AUL) and Centrifuge Retention Capacity (CRC) to some extent at least.

JP S63-218702 describes a continuous process for producing water-absorbing polymeric particles by suspension polymerization.

WO 2006/014031 A1 describes a process for producing water-absorbing polymeric particles comprising a low level of hydrophobic solvents by suspension polymerization. It is an essential feature of the process that the hydrophobic solvent used in the suspension polymerization is removed before postcrosslinking. Subsequent thermal postcrosslinking further reduces the level of hydrophobic solvent in the product.

It is an object of the present invention to provide an improved process for producing water-absorbing polymeric particles by suspension polymerization which have a low level of hydrophobic solvent, in particular when the process is implemented on a large scale.

We have found that this object is achieved by a process for producing water-absorbing polymeric particles by a suspension polymerization in which a monomer solution is metered into a stirred reactor via at least one feed line and the stirred reactor contains at least one hydrophobic solvent, wherein the stirred reactor has a volume of at least 1 $m^3$ and the at least one feed line ends in the stirred reactor at a point less than 25 cm above the liquid surface.

Hydrophobic solvents have a 23° C. solubility in water of less than 5 g/100 g, preferably less than 1 g/100 g and more preferably less than 0.5 g/100 g.

The volume of the stirred reactor is preferably at least 2 $m^3$, more preferably at least 3 $m^3$ and most preferably at least 4 $m^3$.

The feed line ends preferably less than 20 cm, more preferably less than 10 cm and most preferably less than 5 cm above the liquid surface in the reactor.

The vertical distance between the end of the feed line and the liquid surface can be adjusted to the desired value by various measures. Examples thereof are using a feed line extended into the stirred reactor; raising the fill level of the stirred reactor; or moving the feed line to a lower point on the reactor wall. It is also possible for two or more measures to be carried out at one and the same time.

The speed with which the monomer solution exits into the stirred reactor at the end of the feed line is preferably in the range from 0.001 to 2 m/s, more preferably in the range from 0.01 to 1 m/s and most preferably in the range from 0.1 to 0.5 m/s.

The metering rate of the monomer solution is preferably at least 100 kg/h, more preferably at least 250 kg/h and most preferably at least 500 kg/h.

When the suspension polymerization is implemented on a large industrial scale, the feed lines to the stirred reactor used typically end at the reactor lid. This measure serves to avoid caked deposits forming on structural components projecting into the reactor.

Since the reactors, for safety reasons, still need sufficient gas space above the liquid surface, the distance between the feed line and the liquid surface will inevitably increase with the size of the stirred reactor.

The present invention rests on the discovery that as the drop height, i.e., the distance between the feed line for the monomer solution and the liquid surface in the stirred reactor, increases, so does the level of hydrophobic solvent in the end product. Owing to the dimensioning of laboratory apparatus, this effect can only arise in manufacturing-scale facilities.

A drop height of 0, i.e., an immersed feed line, is particularly advantageous.

Therefore, in a preferred embodiment of the present invention, the feed line for the monomer solution dips into the liquid in the reactor, i.e., the feed line ends below the liquid surface. The feed line ends preferably at least 20%, more preferably at least 50% and most preferably at least 70% below the liquid surface, the distance of the liquid surface from the reactor floor being 100%.

The reaction is preferably carried out under reduced pressure, for example at a pressure of 800 mbar. The boiling point of the reaction mixture can be adjusted to the desired reaction temperature via the pressure.

The water-absorbing polymeric particles have a Centrifuge Retention Capacity (CRC) of typically at least 15 g/g, preferably at least 20 g/g, more preferably at least 25 g/g, even more preferably at least 30 g/g and most preferably at least 35 g/g. The Centrifuge Retention Capacity (CRC) of the water-absorbing polymeric particles is typically less than 60 g/g, Centrifuge Retention Capacity (CRC) being determined in accordance with the EDANA (European Disposables and Nonwovens Association) recommended test method No. 441.2-02 "Centrifuge retention capacity".

Useful hydrophobic solvents include all solvents known to a skilled person for use in suspension polymerization. Preference is given to using solvents on a hydrocarbon or silicone oil basis.

Examples of hydrocarbon-based solvents include aliphatic hydrocarbons, for example hexane, heptane, dodecane, cyclohexane, methylcyclohexane, isooctane and hydrogenated triisobutylene, and aromatic hydrocarbons, for example benzene, toluene, xylene and ethylbenzene, or mixtures thereof.

Examples of solvents based on silicone oil include octamethylcyclotetrasiloxane, decamethylcyclopentasiloxane, hexamethyldisiloxane and octamethyltrisiloxane or mixtures thereof.

Preference among these solvents is given to those having a boiling point between 50 and 180° C. Heptane and cyclohexane are particularly preferred. The ratio between the hydrophobic solvents and the monomer solution is preferably in the range from 0.9 to 1.1.

The average diameter of the monomer solution droplets is preferably at least 200 μm, more preferably in the range from 250 to 800 μm and most preferably in the range from 300 to 600 μm, the droplet diameter, which is the volume average diameter, being determinable by light scattering. The diameter of the monomer solution droplets can be adjusted via the stirring energy introduced.

To disperse the aqueous monomer solution in the hydrophobic solvent and to disperse the resulting water-absorbing polymeric particles it is preferable to add dispersing assistants. These may be anionic, cationic, nonionic or amphoteric surfactants or natural, semisynthetic or synthetic polymers.

Examples of anionic surfactants are sodium polyoxyethylene dodecyl ether sulfate and sodium dodecyl ether sulfate. An example of a cationic surfactant is trimethylstearyl-ammonium chloride. An example of an amphoteric surfactant is carboxymethyl-dimethylcetylammonium. Examples of nonionic surfactants are sucrose fatty acid esters, such as sucrose monostearate and sucrose dilaurate, sorbitan esters, such as sorbitan monostearate, polyoxyalkylene compounds based on sorbitan esters, such as polyoxyethylene sorbitan monostearate.

Examples of natural or semisynthetic polymers are cellulose derivatives, such as cellulose ethers, for example ethylcellulose, and cellulose esters, for example cellulose acetates. Examples of synthetic polymers are polyvinyl alcohols, polyvinyl alcohol derivatives, maleic acid-butadiene copolymers and quaternary salts, such as styrenedimethylaminoethyl methacrylate.

The dispersing assistant is customarily dissolved or dispersed in the hydrophobic solvent.

The dispersing agent is used in amounts between 0.01% and 10% by weight, preferably between 0.2% and 5% by weight and more preferably between 0.5% and 2% by weight, based on the monomer solution.

Dispersing assistant identity and amount can be used to control the diameter of the monomer solution droplets.

Advantageously, two or more stirred reactors are connected in series. The supplementary reaction in further stirred reactors can be used to increase the monomer conversion and to reduce backmixing.

It is further advantageous in this embodiment when the first stirred reactor is not excessively large. As the stirred reactor increases in size, the size distribution of the dispersed monomer solution droplets will inevitably broaden. A comparatively small first reactor therefore makes it possible to produce water-absorbing polymeric particles having a particularly narrow particle size distribution.

The monomer solutions to be used in the process of the present invention comprise typically at least one ethylenically unsaturated monomer a), selectively at least one crosslinker b), at least one initiator c) and water d).

The monomers a) are preferably water soluble, i.e., the solubility in water at 23° C. is typically at least 1 g/100 g of water, preferably at least 5 g/100 g of water, more preferably at least 25 g/100 g of water and most preferably at least 50 g/100 g of water, and preferably have at least one acid group each.

Suitable monomers a) are for example ethylenically unsaturated carboxylic acids, such as acrylic acid, methacrylic acid, maleic acid, fumaric acid and itaconic acid. Acrylic acid and methacrylic acid are particularly preferred monomers. Acrylic acid is most preferable.

Preferred monomers a) have at least one acid group, and the acid groups are typically in an at least partly neutralized state, the degree of neutralization being preferably in the range from 25 to 95 mol %, more preferably in the range from 50 to 80 mol % and even more preferably in the range from 60 to 75 mol %. Customary neutralizing agents can be used, preference being given to alkali metal hydroxides, alkali metal oxides, alkali metal carbonates or alkali metal bicarbonates and also mixtures thereof. Instead of alkali metal salts it is also possible to use ammonium salts. Sodium and potassium are particularly preferred as alkali metals, but most preference is given to potassium hydroxide, potassium carbonate or potassium bicarbonate and also mixtures thereof.

The proportion of the total amount of monomers a) which is attributable to acrylic acid and/or its salts is preferably at least 50 mol %, more preferably at least 90 mol % and most preferably at least 95 mol %.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

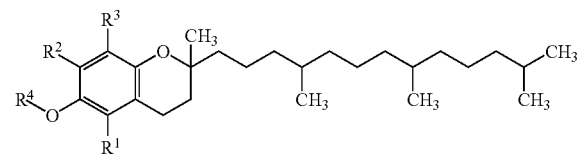

where $R^1$ is hydrogen or methyl, $R^2$ is hydrogen or methyl, $R^3$ is hydrogen or methyl and $R^4$ is hydrogen or an acid radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3=$methyl, especially racemic alpha-tocopherol. $R^1$ is more preferably hydrogen or acetyl. RRR-alpha-Tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

Crosslinkers b) are compounds having at least two polymerizable groups which can be free-radically interpolymerized into the polymer network. Useful crosslinkers b) include for example ethylene glycol dimethacrylate, diethylene glycol diacrylate, allyl methacrylate, trimethylolpropane triacrylate, triallylamine, tetraallyloxyethane as described in EP 530 438 A1, di- and triacrylates as described in EP 547 847 A1, EP 559 476 A1, EP 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures as described for example in DE 195 43 368 A1, DE 196 46 484 A1, WO 90/15830 A1 and WO 2002/32962 A2.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP 343 427 A2. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention may utilize di(meth)acrylates of polyethylene glycols, the polyethylene glycol used having a molecular weight between 100 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of at least 40-tuply ethoxylated glycerol, of at least 40-tuply ethoxylated trimethylolethane and also of at least 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred.

The amount of crosslinker b) is preferably less than 0.5% by weight, more preferably less than 0.05% by weight and most preferably less than 0.01% by weight, all based on the monomer a).

Useful initiators c) include all compounds that disintegrate into free radicals under the polymerization conditions, examples being peroxides, hydroperoxides, hydrogen peroxide, persulfates, azo compounds and the so-called redox initiators. The use of water-soluble initiators is preferred. In some cases, it is advantageous to use mixtures of various initiators, for example mixtures of hydrogen peroxide and sodium peroxo-disulfate or potassium peroxodisulfate. Mixtures of hydrogen peroxide and sodium peroxodisulfate can be used in any proportion.

Particularly preferred initiators c) are azo initiators, such as 2,2'-azobis[2-(2-imidazolin-2-yl)propane]dihydrochloride and 2,2'-azobis[2-(5-methyl-2-imidazolin-2-yl)propane]dihydrochloride, and photoinitiators, such as 2-hydroxy-2-methylpropiophenone and 1-[4-(2-hydroxyethoxy)phenyl]-2-hydroxy-2-methyl-1-propan-1-one, redox initiators, such as sodium persulfate/hydroxymethylsulfinic acid, ammonium peroxodisulfate/-hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators, such as 1-[4-(2-hydroxyethoxy)phenyl]-2-hydroxy-2-methyl-1-propan-1-one, and also mixtures thereof.

The initiators are used in customary amounts, for example in amounts from 0.001% to 5% by weight and preferably from 0.01% to 1% by weight, based on the monomers a).

The preferred polymerization inhibitors require dissolved oxygen for optimum performance. Therefore, the monomer solution may be freed of dissolved oxygen prior to polymerization by inertization, i.e., by flowing an inert gas, preferably nitrogen, through it. Preferably, the oxygen content of the monomer solution is lowered to less than 1 weight ppm and more preferably less than 0.5 weight ppm prior to polymerization.

The polymer dispersion claimed is advantageously azeotropically dewatered in at least one further vessel.

The dried water-absorbing polymeric particles have a water content of preferably below 15% by weight and in particular below 10% by weight. Water content is determined in accordance with EDANA (European Disposables and Nonwovens Association) recommended test method No. 430.2-02 "Moisture content".

The polymeric particles may be postcrosslinked to further improve their properties. Useful postcrosslinkers are compounds comprising two or more groups capable of forming covalent bonds with the carboxylate groups of the hydrogel. Suitable compounds are for example alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Furthermore, DE 40 20 780 C1 describes cyclic carbonates, DE 198 07 502 A1 2-oxazolidone and its derivatives, such as 2-hydroxyethyl-2-oxazolidone, DE 198 07 992 C1 bis- and poly-2-oxazolidinones. DE 198 54 573 A1 2-oxotetrahydro-1,3-oxazine and its derivatives. DE 198 54 574 A1 N-acyl-2-oxazolidones, DE 102 04 937 A1 cyclic ureas, DE 103 34 584 A1 bicyclic amide acetals. EP 1 199 327 A2 oxetanes and cyclic ureas and WO 2003/31482 A1 morpholine-2,3-dione and its derivatives as useful postcrosslinkers.

It is further possible to use postcrosslinkers comprising additional polymerizable ethylenically unsaturated groups, as described in DE 37 13 601 A1.

The amount of crosslinker is preferably in the range from 0.01% to 1% by weight, more preferably in the range from 0.05% to 0.5% by weight and most preferably in the range from 0.1% to 0.2% by weight, all based on the polymer.

In a preferred embodiment, polyvalent cations are applied to the particle surface in addition to postcrosslinkers.

Useful polyvalent cations for the process of the present invention include for example bivalent cations, such as the cations of zinc, magnesium, calcium and strontium, tervalent cations, such as the cations of aluminum, iron, chromium, rare earths and manganese, quadruvalent cations, such as the cations of titanium and zirconium. Useful counterions include chloride, bromide, sulfate, hydrogensulfate, carbonate, bicarbonate, nitrate, phosphate, hydrogenphosphate, dihydrogenphosphate and carboxylate, such as acetate and lactate. Aluminum sulfate is preferred. The amount used of polyvalent cation is for example in the range from 0.001% to 0.5% by weight, preferably in the range from 0.005% to 0.2% by weight and more preferably in the range from 0.02% to 0.1% by weight, all based on the polymer.

The postcrosslinking step can be carried out in two different ways.

First, the dewatered polymer dispersion may be filtered, selectively dried and only the resulting water-absorbing polymeric particles postcrosslinked (postcrosslinking A). This form of postcrosslinking is typically carried out by spraying a solution of the post-crosslinker and selectively a solution of the polyvalent cation onto the water-absorbing polymeric particles. Thermal drying follows the spraying step, and the postcrosslinking reaction can take place not only before but also during drying.

The spraying with a solution of the crosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige mixers, Bepex mixers, Nauta mixers, Processall mixers and Schugi mixers.

Contact dryers are preferable, shovel dryers more preferable and disk dryers most preferable as apparatus in which thermal drying is carried out. Useful dryers include for example Bepex dryers and Nara dryers. Fluidized bed dryers can be used as well.

Drying can take place in the mixer itself, by heating the jacket or by blowing warm air into the mixer. Also suitable is a downstream dryer, for example a tray dryer, a rotary tube oven or a heatable screw. A fluidized bed dryer is particularly advantageously used for mixing and drying.

Preferred drying temperatures range from 100 to 250° C., preferably from 120 to 220° C. and more preferably from 130 to 210° C. The preferred residence time at this temperature in the reaction mixer or dryer is preferably at least 10 minutes, more preferably at least 20 minutes and most preferably at least 30 minutes.

Secondly, the postcrosslinkers and selectively the polyvalent cations can also be added to the selectively dewatered polymer dispersion, preferably as an aqueous solution (postcrosslinking B). This is followed by thermal postcrosslinking. Since the reaction temperature in this version is limited by the boiling point of the hydrophobic solvent used as a dispersant, there is a preference for using reactive postcrosslinkers, such as di- or polyepoxides. After thermal postcrosslinking, the polymer is selectively azetoptropically dewatered, filtered and dried.

The process of the present invention can also be carried out advantageously as a continuous operation.

The water-absorbing polymeric particles are tested using the test methods described hereinbelow.

Methods:

Measurements should be carried out, unless otherwise stated, at an ambient temperature of 23±2° C. and a relative humidity of 50±10%. The water-absorbing polymers are thoroughly commixed before measurement.

Residual Monomers

The level of residual monomers in the water-absorbing polymeric particles is determined in accordance with EDANA (European Disposables and Nonwovens Association) recommended test method No. 410.2-02 "Residual monomers".

Centrifuge Retention Capacity (CRC)

The centrifuge retention capacity of the water-absorbing polymeric particles is determined in accordance with EDANA (European Disposables and Nonwovens Association) recommended test method No. 441.2-02 "Centrifuge retention capacity".

Absorbency Under Load (AUL 0.7 psi)

Absorbency under load is determined in accordance with EDANA (European Disposables and Nonwovens Association) recommended test method No. 442.2-02 "Absorption under pressure", using a weight of 49 g/cm² (0.7 psi) instead of 21 g/cm² (0.3 psi).

EXAMPLES

The following solutions were made up in separate stirred tanks:

Monomer solution:

360.3 kg (5 kmol) of acrylic acid
196.4 kg (3.5 kmol) of potassium hydroxide
0.492 kg of polyethylene glycol 300 diacrylate
538.8 kg of water Initiator solution:

0.476 kg (2 mol) of potassium persulfate
7.2 kg of water

Organic phase:

1136 kg of cyclohexane (about 1630 l)
11.36 kg of ethylcellulose (comprising 49.5% of ethoxy groups)

Procedure:

A 5 m³ stirred tank equipped with blade stirrer, heating/cooling jacket, reflux condenser and means for azeotropic removal of water was charged with the cyclohexane, and the appropriate amount of ethylcellulose was dispersed therein by stirring. This was followed by inertization with nitrogen and heating to reflux (80° C.).

Then, in the course of 1.5 hours, the monomer solution was metered into the stirred tank together with the initiator solution, the monomer and initiator solutions being mixed by a static mixer shortly before entry into the reactor. Reflux conditions were maintained during the entire period of monomer addition.

The inlet tubes into the reactor were height adjustable, so that different dispensing heights above/below the liquid surface were settable. The diameter of the inlet tubes was dimensioned such that the monomer solution was introduced into the organic phase in a thin, nonturbulent jet having a very low speed of flow. Altogether, 10 inlet tubes were used. The 10 inlet tubes had a spacing of 2 cm and were disposed perpendicularly to the tangential direction of the stirring shaft.

The resulting suspension was supplementarily reacted for one hour. The residual water content of the polymeric particles obtained was then lowered to 40% by weight by azeotropic removal of water.

Then, 1.0 kg of ethylene glycol diglycidyl ether was added before supplementary reaction under reflux conditions for 2 hours. During this period, water was removed to give a solids content of about 80% by weight for the polymeric particles.

The suspension was then cooled down and the polymeric particles were filtered off. Further drying was carried out at 60° C. in a paddle dryer to a residual moisture content of 5% by weight.

Example 1

Comparative

The inlet tubes for the monomer solution ended 1.2 m above the liquid surface.

The product thus obtained had the following properties:

| | |
|---|---|
| CRC: | 34.2 g/g |
| AUL0.7 psi: | 23.1 g/g |
| Residual monomers: | 70 ppm |
| Residual solvent: | 10 ppm |
| Average particle size: | 340 μm |
| Particles <200 μm: | 10% by weight |
| Particles >600 μm: | 12% by weight |

Example 2

The inlet tubes for the monomer solution ended 0.2 m above the liquid surface.

The product thus obtained had the following properties:

| | |
|---|---|
| CRC: | 35.6 g/g |
| AUL0.7 psi: | 25.0 g/g |
| Residual monomers: | 20 ppm |
| Residual solvent: | 0.1 ppm |
| Average particle size: | 380 μm |
| Particles <200 μm: | 1% by weight |
| Particles >600 μm: | 2% by weight |

Example 3

The inlet tubes for the monomer solution ended 0.5 m below the liquid surface.

The product thus obtained had the following properties:

| | |
|---|---|
| CRC: | 35.1 g/g |
| AUL0.7 psi: | 24.9 g/g |
| Residual monomers: | 2 ppm |
| Residual solvent: | <0.1 ppm |
| Average particle size: | 400 μm |
| Particles <200 μm: | 1% by weight |
| Particles >600 μm: | 2% by weight |

The process of the present invention provides polymeric particles having a lower residual monomer and residual solvent content and also a narrower particle size distribution.

I claim:

1. A process for producing water-absorbing polymeric particles by a suspension polymerization in which a monomer solution is metered into a stirred reactor via at least one feed line and the stirred reactor contains at least one hydrophobic solvent, wherein the stirred reactor has a volume of at least 1 m$^3$ and the at least one feed line ends in the stirred reactor at a point less than 25 cm above the liquid surface.

2. The process according to claim 1 wherein the speed with which the monomer solution exits into the stirred reactor at the end of the feed line is in a range from 0.001 to 2 m/s.

3. The process according to claim 1 wherein the feed line ends below the liquid surface.

4. The process according to claim 1 wherein the average diameter of monomer solution droplets in a course of the suspension polymerization is in the range from 300 to 600 μm.

5. The process according to claim 1 wherein a dispersing assistant is used in the suspension polymerization.

6. The process according to claim 1 wherein the reaction mixture is supplementarily reacted in at least one further stirred reactor.

7. The process according to claim 1 wherein a reaction mixture is azeotropically dewatered.

8. The process according to claim 7 wherein the azeotropically dewatered reaction mixture is filtered, dried and post-crosslinked.

9. The process according to claim 7 wherein the azeotropically dewatered reaction mixture is postcrosslinked, azeotropically dewatered, filtered and dried.

10. The process according to claim 1 wherein the water-absorbing polymeric particles comprise at least 50 mol % of at least partially neutralized polymerized acrylic acid.

11. The process according to claim 1 wherein the water-absorbing polymeric particles comprise less than 0.1% by weight of an interpolymerized crosslinker.

12. The process according to claim 1 wherein the water-absorbing polymeric particles have a Centrifuge Retention Capacity of at least any 15 g/g.

\* \* \* \* \*